(12) United States Patent
Zhang et al.

(10) Patent No.: US 9,324,369 B2
(45) Date of Patent: *Apr. 26, 2016

(54) DATA RECORDING MEDIUM AND METHOD FOR GENERATING A REFERENCE CLOCK SIGNAL

(71) Applicant: Marvell International Ltd., Hamilton (BM)

(72) Inventors: Jingliang Zhang, Singapore (SG); Lin Lin Thi, Singapore (SG); Zhimin Yuan, Singapore (SG); Bo Liu, Singapore (SG)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 14/580,911

(22) Filed: Dec. 23, 2014

(65) Prior Publication Data

US 2015/0206552 A1    Jul. 23, 2015

Related U.S. Application Data

(63) Continuation of application No. 13/683,161, filed on Nov. 21, 2012, now Pat. No. 8,922,926.

(30) Foreign Application Priority Data

Nov. 21, 2011  (SG) .......................... SG201108625-3

(51) Int. Cl.
| | | |
|---|---|---|
| *G11B 5/596* | (2006.01) | |
| *G11B 20/14* | (2006.01) | |
| *G11B 27/30* | (2006.01) | |
| *G11B 7/2403* | (2013.01) | |
| *G11B 27/24* | (2006.01) | |
| *G11B 20/12* | (2006.01) | |

(52) U.S. Cl.
CPC ............ *G11B 20/14* (2013.01); *G11B 5/59655* (2013.01); *G11B 5/59688* (2013.01); *G11B 7/2403* (2013.01); *G11B 20/1217* (2013.01); *G11B 27/24* (2013.01); *G11B 27/3063* (2013.01); *G11B 2020/1238* (2013.01); *G11B 2220/235* (2013.01); *G11B 2220/2508* (2013.01)

(58) Field of Classification Search
None
See application file for complete search history.

(56) References Cited

U.S. PATENT DOCUMENTS

| | | |
|---|---|---|
| 3,219,353 A | 11/1965 | Prentky |
| 3,404,392 A | 10/1968 | Sordello |
| 3,864,740 A | 2/1975 | Sordello et al. |
| 4,048,660 A | 9/1977 | Dennison et al. |
| 4,286,296 A | 8/1981 | Cunningham |
| 4,488,188 A | 12/1984 | Hansen et al. |
| 4,490,756 A | 12/1984 | Dost et al. |

(Continued)

OTHER PUBLICATIONS

Search Report issued by the Danish Patent and Trademark Office for corresponding Singapore Patent Application No. 201305561-1, 8 pages, (Sep. 26, 2014).

(Continued)

*Primary Examiner* — Brian Butcher

(57) ABSTRACT

Various embodiments provide a recording medium. The recording medium may include a dedicated servo layer for providing servo information. The dedicated servo layer may include a plurality of tracks. A first track may include a first servo signal. A second track may include a second servo signal. The first servo signal and the second servo signal may include a plurality of common transitions. The transitions may be provided at a pre-determined frequency.

15 Claims, 5 Drawing Sheets

(56) References Cited

U.S. PATENT DOCUMENTS

| | | |
|---|---|---|
| 4,910,617 A | 3/1990 | Brunnett et al. |
| 5,095,471 A | 3/1992 | Sidman |
| 5,777,816 A | 7/1998 | Hampshire et al. |
| 5,838,512 A | 11/1998 | Okazaki |
| 5,912,778 A | 6/1999 | Kalfs et al. |
| 6,122,117 A | 9/2000 | Aikawa |
| 6,574,068 B1 | 6/2003 | Hampshire et al. |
| 6,614,608 B1 | 9/2003 | Belser et al. |
| 6,873,482 B1 | 3/2005 | Hsieh et al. |
| 7,012,773 B2 | 3/2006 | Ashikaga et al. |
| 7,710,676 B1 | 5/2010 | Chue |
| 7,916,415 B1 | 3/2011 | Chue |
| 7,982,994 B1 | 7/2011 | Erden et al. |
| 8,922,926 B2 * | 12/2014 | Zhang et al. .................. 360/51 |
| 2005/0141123 A1 | 6/2005 | Roth |
| 2010/0020435 A1 | 1/2010 | Chen et al. |
| 2010/0328804 A1 * | 12/2010 | Yamashita et al. .............. 360/51 |
| 2011/0181978 A1 | 7/2011 | Rub |
| 2012/0105994 A1 | 5/2012 | Bellorado et al. |
| 2012/0154498 A1 | 6/2012 | Chiwata |
| 2012/0154948 A1 | 6/2012 | Tamai et al. |
| 2013/0155826 A1 * | 6/2013 | Zhang et al. ................ 369/30.25 |
| 2014/0139940 A1 | 5/2014 | Ong et al. |
| 2014/0204486 A1 * | 7/2014 | Zhang et al. .................. 360/135 |

OTHER PUBLICATIONS

Written Opinion issued by the Danish Patent and Trademark Office for corresponding Singapore Patent Application No. 201305561-1, 11 pages, (Sep. 26, 2014).

Search Report and Written Opinion received for Singapore Application No. 201305431-7 dated Sep. 26, 2014, 18 pages.

* cited by examiner

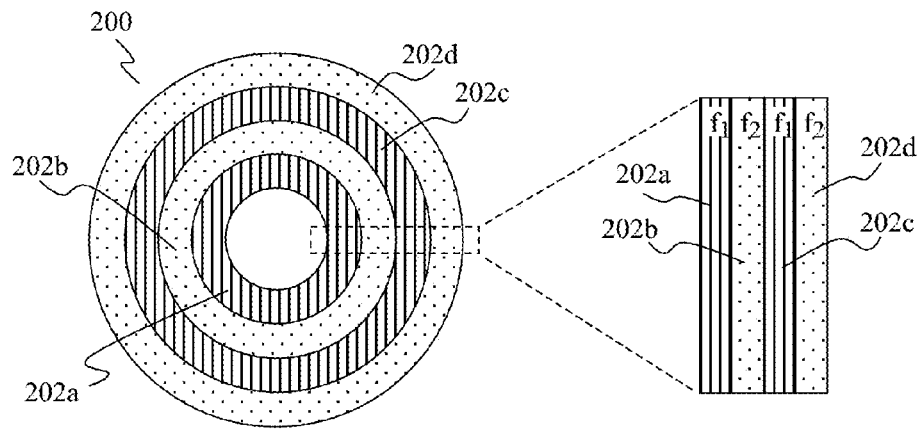
FIG. 2A  FIG. 2B
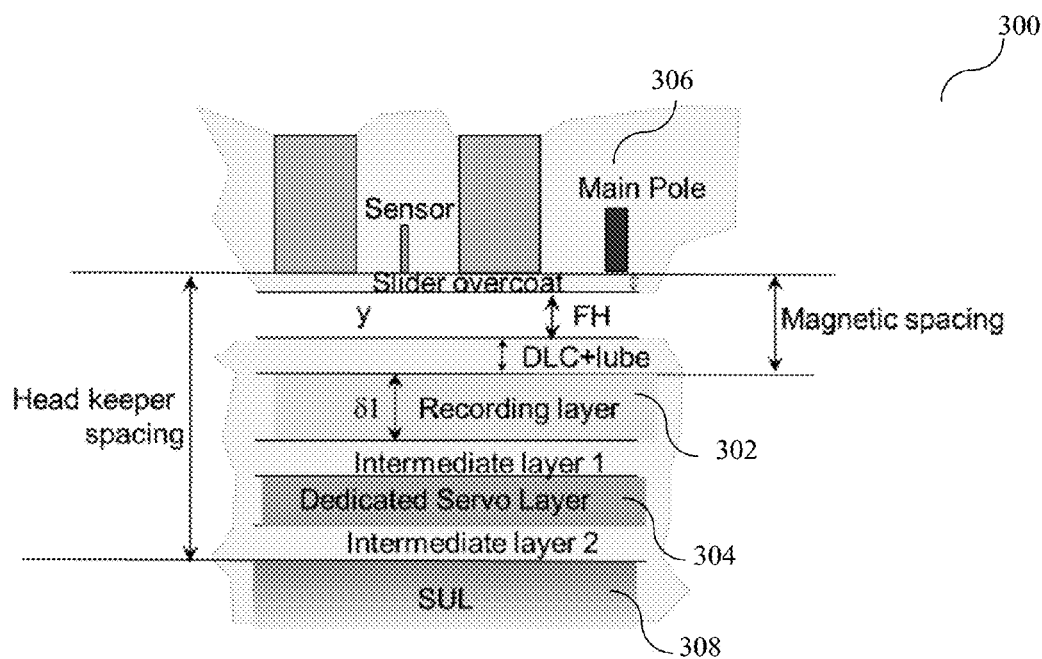
FIG. 3

DATA RECORDING MEDIUM AND METHOD FOR GENERATING A REFERENCE CLOCK SIGNAL

CROSS-REFERENCE TO RELATED APPLICATIONS

This application is a continuation of U.S. application Ser. No. 13/683,161, filed Nov. 12, 2012, now U.S. Pat. No. 8,922, 926, which claims the benefit of the Singapore patent application 201108625-3 filed Nov. 21, 2011, the contents of which are incorporated herein by reference for all purposes.

TECHNICAL FIELD

Embodiments relate generally to a data storage medium and a method for generating a reference clock signal. Specifically, embodiments relate to a data storage device having a dedicated servo layer, and to a method for generating a reference clock signal for synchronization of read and write operations of a data storage device.

BACKGROUND

Electronic devices, including mobile computing and/or communication devices, are becoming smaller thereby driving the weight and size of data storage devices down, while requiring large storage capacity in the terabyte range and low power consumption. An increasing storage capacity would require the need for increased precision in tracking the movement of the read/write head.

Data storage devices, for example hard disk drives (HDDs), employ servo systems for tracking and controlling the movement of the read/write head. Conventional servo systems, e.g., as shown in FIG. 1A, employ embedded servo where the servo information runs radially across the tracks 110 from the inner diameter (ID) to the outer diameter (OD) of the disc 100 in a series of "servo wedges" 120 interspersed with data 130. Therefore, the servo information is only detected when the read/write head moves over these servo wedges 120. In between the servo wedges, no servo information is received by the head.

Data storage devices also employ dedicated servo, e.g. as shown in FIG. 1B, where the servo information is provided on a servo layer 150 distinct from the data recording layer 160. In addition, conventional servo systems typically employs ABCD servo-burst-signal pattern.

Furthermore, in conventional hard disk drives and similar data storage devices, the head either reads or writes, but cannot perform both operations simultaneously.

SUMMARY

Various embodiments provide a recording medium. The recording medium may include a dedicated servo layer for providing servo information. The dedicated servo layer may include a plurality of tracks. A first track may include a first servo signal. A second track may include a second servo signal. The first servo signal and the second servo signal may include a plurality of common transitions. The common transitions may be provided at a pre-determined frequency.

Various embodiments provide a method for generating a reference clock signal for synchronization of at least one of a read operation and a write operation of a data storage device. The method may include generating the reference clock signal based on a plurality of tracks in a dedicated servo layer of the data storage device. A first track may include a first servo signal. A second track may include a second servo signal. The first servo signal and the second servo signal may include a plurality of common transitions, wherein the common transitions are provided at a pre-determined frequency.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which:

FIGS. 2A and 2B shows a recording medium according to various embodiments.

FIG. 3 shows a media structure with dedicated servo layer.

DESCRIPTION

Figure 1A:
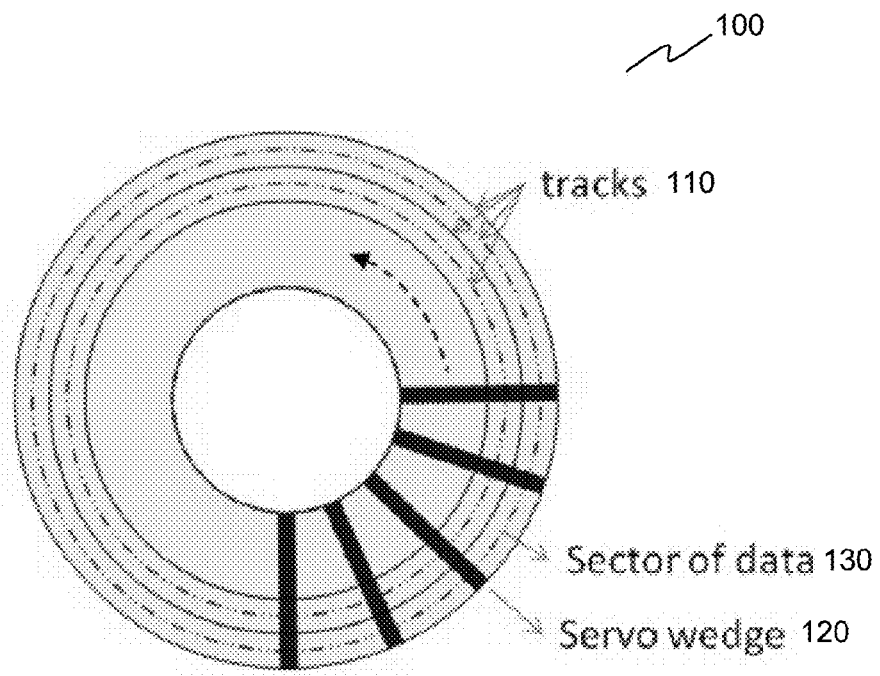
FIG. 1A shows a disk surface with embedded servo.
Figure 1B:
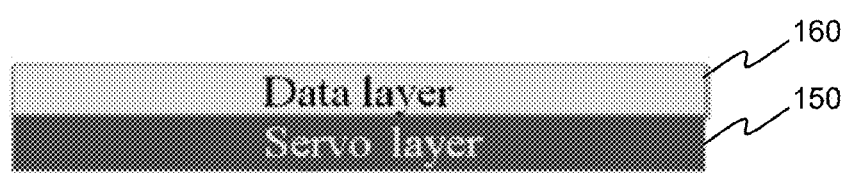
FIG. 1B shows a dual layer medium with dedicated servo.

In general, a head-positioning servomechanism is provided in a data storage device, e.g. a hard disk drive (HDD), which acts as a control system. The control system may position the head (e.g. read/write (R/W) head) which is mounted on an actuator over a desired data track of a storage medium and reposition the head from one data track to another.

In a HDD servo control system, the position of the head relative to the center of the desired data track, and therefore the position error signal (PES), may be sensed and used by the servo system to generate the appropriate commands to the actuator, which in turn moves the head in an effort to reduce the position error. PES is a signal proportional to the relative difference of the positions of the centre of the head and the nearest track centre. Therefore, the PES may provide an indication of the position of the head relative to the storage medium, for example the position of the head relative to a data track, and whether the head is positioned at the centre of the data track (on track) or shifted relative to the centre of the data track (off track) and the magnitude of the shift, such that the position of the head may then be adjusted.

In a dedicated servo implementation, one disk surface (servo layer) is dedicated to store the position data referred to as servo data or servo signal. The servo layer may be a buried layer arranged beneath the data recording layer and may have a perpendicular or a longitudinal magnetization orientation for providing magnetic information for determining the location of the head in relation to the storage medium. The servo information is provided on the servo layer distinct from the data recording layer so as to allow continuously available servo readback to enable continual position feedback thereby providing continual position detection without utilizing any of the recording layer for position detection. This may provide higher positioning accuracy through continual location determination, while also removing the servo sectors/tracks from the recording layer, thereby increasing surface utilization of the storage space in the recording layer and further increasing the data recording track density by increasing the track positioning accuracy. Further, the servo layer and data layer may be put on the same side and they may be read and/or processed together; this may also be referred to as dedicated servo.

The dedicated servo layer may have a continuous track structure having a plurality of servo tracks in a concentric arrangement. Adjacent servo tracks may be alternately assigned different frequency signals, having respective frequencies $f_1$ and $f_2$, as illustrated in FIGS. 2A and 2B for a portion of the servo layer 200 towards its inner diameter, showing four servo tracks 202a, 202b, 202c, 202d. In this configuration, the head of the data storage device may be positioned in between two adjacent tracks (e.g. 202a and 202b; 202b and 202c), for example at the boundary of the two adjacent tracks, and may be able to obtain a readback servo signal having frequencies $f_1$ and $f_2$.

Therefore, in various embodiments of a dedicated servo system, each servo track has a single frequency. The position error signal (PES) may be produced from the frequency based servo signal, including dual/triple frequency based signals. Using the dual frequency based servo signal as an example, during track following, the center of the head may be positioned at the middle of two adjacent servo tracks, whereby the head picks up a readback servo signal having two frequencies from the two adjacent servo tracks at the same time.

For a data storage device with an embedded servo, the clock used to trig the write buffer is a free-run fixed clock during the writing of data. In order to decode the sequential readback data correctly, timing recovery is needed to generate a synchronization signal such that the readback data is sampled synchronously. The timing recovery is done by including a preamble in front of the data sectors and scrambling the user data, wherein the preamble is used to initialize a digital phase lock loop (DPLL) and the scrambling is used to prevent transitions in user data which may cause the DPLL to lose the phase lock. The scrambling of user data may reduce the coding efficiency for the read write channel.

The data storage device may include a memory which is for example used in the processing carried out by the data storage device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In the context of various embodiments, a "circuit" may be understood as any kind of a logic implementing entity, which may be special purpose circuitry or a processor executing software stored in a memory, firmware, or any combination thereof. Thus, in an embodiment, a "circuit" may be a hardwired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment.

In the context of various embodiments, the data storage device may be a hard disk drive (HDD).

In the context of various embodiments, the term "head" may include a magnetic head. In addition, the "head" may refer to the read/write head for reading/writing information or data from/to a storage/recording medium. The head includes a reader and a writer. The head is positioned over a storage medium and the reader may read signal or information from the storage medium and the writer may write information to the storage medium.

In the context of various embodiments, a data storage device includes a spindle which refers to a mechanical part, which may be rotatable, and that may serve as an axis for a rotatable part held by the spindle. As a non-limiting example, in a hard disk drive, the spindle holds a circular disk (or platter) as storage medium that holds data. A spindle index signal is generated each time the spindle makes a rotation, thereby providing an indication that the spindle has made one rotation (360-degree rotation) in a period between the generation of one spindle index signal and the generation of the next spindle index signal.

Various features described herein in the context of the data storage device may analogously hold true for the method of generating a reference clock signal for synchronization of at least one of a read operation or a write operation of a data storage device, and vice versa.

Various features described above in the context of the method of generating a reference clock signal for synchronization of at least one of read and write operations of a data storage device may analogously hold true for the corresponding device for generating the reference clock signal.

FIG. 3 shows a media structure 300 having a magnetic data layer 302, and a physically separate magnetic layer as a dedicated servo layer 304 for storing the servo information. However, a writing field from a recording/writing head 306 may affect both the magnetic data layer 302 and the dedicated servo layer 304. In other words, the servo information in the servo layer 304 may be overwritten by the writing field. FIG. 3 shows the structure and system configuration of magnetic recording medium with dedicated servo.

Thus, it is desirable that the servo layer 304 has a nucleation field which is high enough to be unaffected by the writing field for writing data on the magnetic data layer 302 (in other words, unlimited writing on the magnetic data layer 302). Therefore, the switching field of the servo layer 304 should be large so that it is harder to write on the servo layer 304 than the magnetic data layer 302.

Further, it is also desirable to place the servo layer 304 below the magnetic data layer 302. The servo layer 304 is arranged further from the recording/writing head 306 than the magnetic data layer 302. The head field decay to the servo layer 304 is larger due to the larger magnetic space from the recording/writing head 306 to the servo layer 304. The head field decay to the servo layer 304 may still be large even if a soft underlayer 308 is arranged below the servo layer 304.

As such, it becomes more difficult to write servo information onto the servo layer 304. A conventional recording/writing head is not able to write servo information onto the servo layer 304. The servo information on servo layer is written with a wide writer head in servo writing process.

With the dedicated servo layer, the majority or all of servo information may be moved from data recording layer to the servo layer. With more area for servo signals, the increased servo sampling rate and the improved signal to noise ratio of servo positioning signal may increase the track density significantly.

In the dedicated servo recording system, the positioning error signal (PES) may be produced from the dual frequency based single tone signal. One servo track may have a single frequency. During track following, the center of the head may stay in between of two servo tracks, A and B. It may pick up the two frequencies at the same time. When it moves more into servo track A, the reader may pick up more $f_A$ signal and less $f_B$ signal, vice versa. The PES of $(V_{fA}-V_{fB})/(V_{fA}+V_{fB})$ is feedback to servo control loop for track following, wherein V may represent the respective amplitude of different frequencies.

According to various embodiments, the continuous servo signals may be used to produce a reference signal for timing recovery in reading operation and for writing process to achieve synchronized writing. With the reference signal, the phase lock loop may control the writing or the reading with removing the time error due to various sources in magnetic recording system.

According to various embodiments, a recording medium may be provided. The recording medium may include a dedicated servo layer for providing servo information. The dedicated servo layer may include or may be a plurality of tracks. A first track may include a first servo signal. A second track may include a second servo signal. The first servo signal and the second servo signal may include a plurality of common transitions. The transitions may be provided at a pre-determined frequency.

The plurality of common transitions may include transitions on a cross track direction.

The first servo signal may include or may be a signal of a first frequency. The second servo signal may include or may be a signal of a second frequency. The first frequency and the second frequency may have an integer least common multiple.

The first frequency and the second frequency may have a ratio of n:m with integer numbers n and m.

The first frequency and the second frequency may have a ratio of n+1:n with an integer number n.

The servo signals may include or may be servo bursts.

Each servo pattern may include or may be a plurality of alternately arranged preambles and servo bursts.

Each servo signal may include information for providing positioning information.

According to various embodiments, a data storage device may be provided. The data storage device may include the recording medium (for example as described above).

The recording medium may further include a data layer configured to record data therein.

The data storage device may further include a phase lock loop circuit configured to generate a reference clock signal for synchronization of at least one of read and write operations, based on the servo signals.

Figure 4:
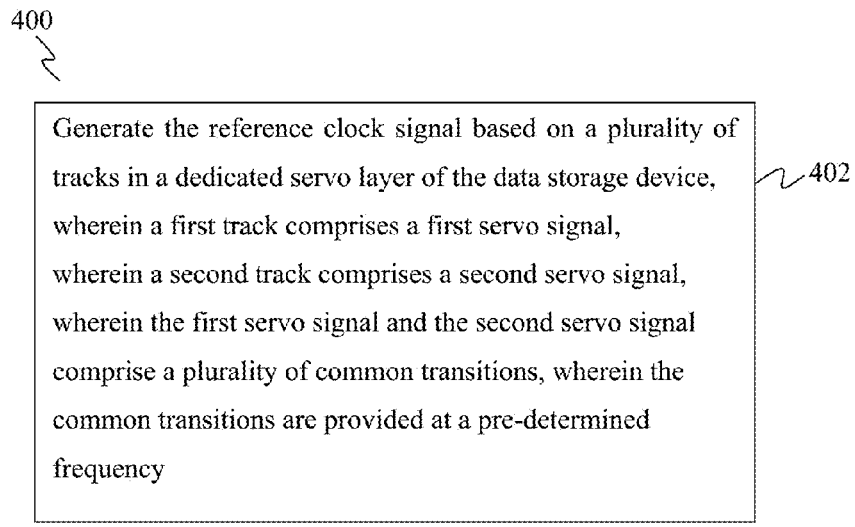
FIG. 4 shows a flow diagram illustrating a method for generating a reference clock signal according to various embodiments.

FIG. 4 shows a flow diagram 400 illustrating a method for generating a reference clock signal for synchronization of at least one of a read operation and a write operation of a data storage device in accordance with various embodiments. In 402, the reference clock signal may be generated based on a plurality of tracks in a dedicated servo layer of the data storage device. A first track may include a first servo signal. A second track may include a second servo signal. The first servo signal and the second servo signal may include a plurality of common transitions. The common transitions may be provided at a pre-determined frequency.

The plurality of common transitions may include or may be transitions on a cross track direction The method may further include: initializing a phase lock loop circuit upon reading of the first signal and the second signal, so as to generate the reference clock signal synchronous with the pre-determined frequency.

The first servo signal may include or may be a signal of a first frequency. The second servo signal may include or may be a signal of a second frequency. The first frequency and the second frequency may have an integer least common multiple.

The first frequency and the second frequency may have a ratio of n:m with integer numbers n and m.

The first frequency and the second frequency may have a ratio of n+1:n with an integer number n.

The servo signals may include or may be servo bursts.

Each servo pattern may include or may be a plurality of alternately arranged preambles and servo bursts.

Each servo signal may include information for providing positioning information.

Figure 5:
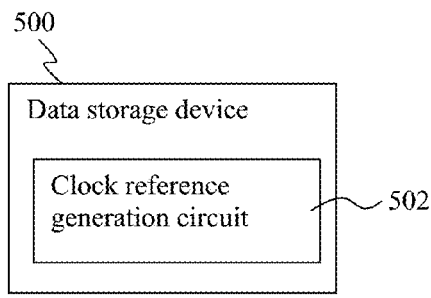
FIG. 5 shows a data storage device according to various embodiments.

FIG. 5 shows a data storage device 500 according to various embodiments. The data storage device 500 may include a clock reference generation circuit 502 configured to generate a reference clock signal for synchronization of at least one of a read operation and a write operation of a data storage device. The clock reference generation circuit 502 may be configured to generate the reference clock signal based on a plurality of tracks in a dedicated servo layer of the data storage device. A first track may include or may be a first servo signal. A second track may include or may be a second servo signal. The first servo signal and the second servo signal may include a plurality of common transitions. The common transitions may be provided at a pre-determined frequency.

The clock reference generation circuit 502 may include a phase lock loop circuit.

According to various embodiments, devices and methods may be provided for synchronization signal generation from synchronized two-frequency servo bursts in dedicated servo.

According to various embodiments, devices and methods may be provided for synchronization signal generation from synchronized two-frequency servo bursts in dedicated servo.

In the dedicated servo system, the PES may be produced from the dual/triple frequency based single tune signals. One servo track may have a single frequency. During track following, the center of the head may stay at the middle of two servo tracks and it picks up two frequency signals at the same time.

For the phase lock loop, it may precisely lock to the phase of one single frequency instantly. But if the head is moving away from the locked frequency track, the signal may become weak and the performance of the PLL may degrade.

According to various embodiments, the two servo frequencies may be arranged in the least common multiple of fraction. The signals may be written with proper phase synchronization.

Figure 6A:
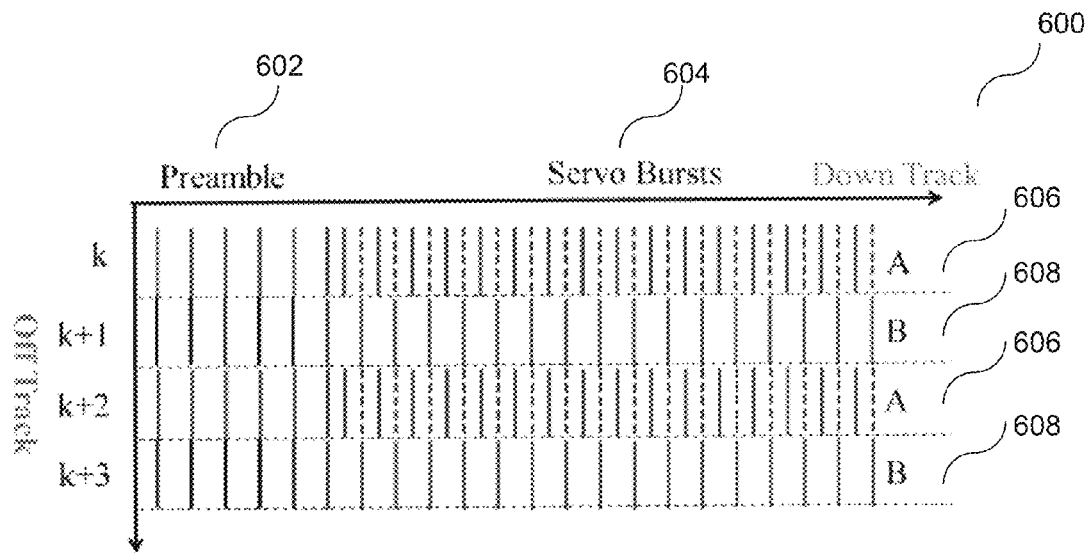
FIG. 6A and FIG. 6B show servo information in accordance with various embodiments.

FIG. 6A shows servo information 600 according to various embodiments. Several tracks (k, k+1, k+2, k+3) are shown, each including a preamble 602 and servo bursts 604. The servo bursts provide signals with such frequencies, that an alternation of the frequency is provided. For example, track k and track k+2 each may provide a first frequency 606 (as indicated by A in FIG. 6A), and track k+1 and track k+3 each may provide a second frequency 608 (as indicated by B in FIG. 6A).

In FIG. 6A, servo information according to various embodiments is shown which may be recorded in the dedicated servo layer with the frequency ratio $(f_A/f_B)=2$.

FIG. 6A shows the servo information according to various embodiments recorded in the dedicated servo layer. A preamble with a single tone signal may be stitch written along cross track direction from inner diameter to outer diameter. The preamble may be used to initialize the digital phase lock loop (DPLL). The dual frequency signals in servo track A and B may have the frequency ratio of $(f_A/f_B)=2$. With stitch written servo signal and frequency arrangement in FIG. 6A, the dash line of servo A may always be aligned with the transition line of servo B. No matter which position the reader moves, it may always pick up an $f_B$ frequency. In this case, the fB signal may always be used by DPLL as the reference for timing recovery.

According to various embodiments, devices and methods may be provided which provide a technology for timing reference.

A preamble may be used to initialize a DPLL (digital PLL).

The ratio of Frequency (A):frequency (B) may be 2:1 as shown in FIG. 6A, and the frequency of synchronized bit may be ½ of frequency of A or the same frequency of B. Low frequency may cause problem. The maximum of frequency may be limited by spacing loss. A frequency of a preamble may also be same as A.

Figure 6B:
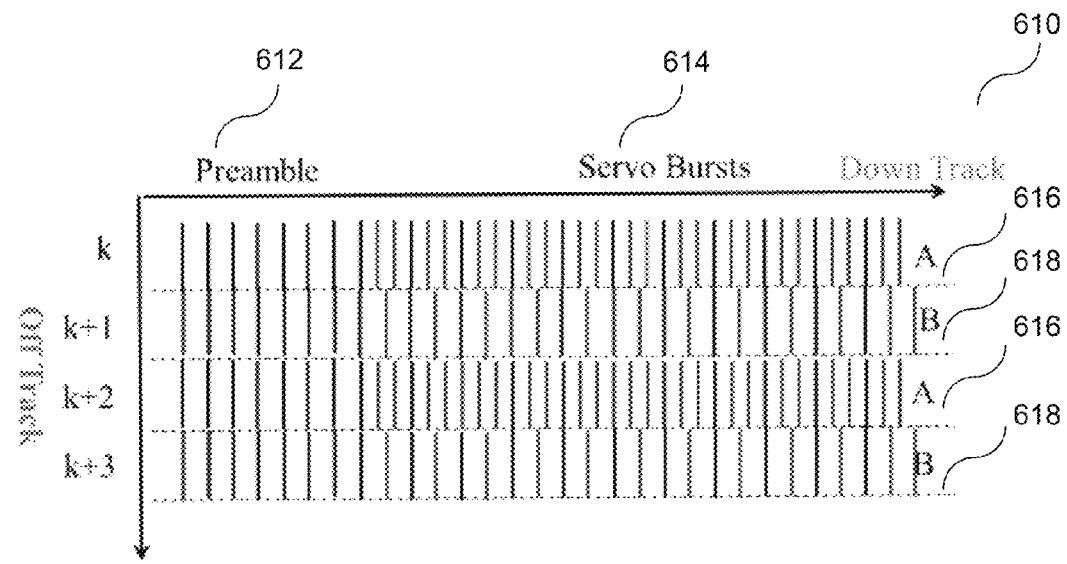

FIG. 6B may be the proposed servo information recorded in the dedicated servo layer with the frequency ratio $(f_A/f_B)$ =3/2 or even less. Several tracks (k, k+1, k+2, k+3) are shown, each including a preamble 612 and servo bursts 614. The servo bursts may provide signals with such frequencies, that an alternation of the frequency is provided. For example, track k and track k+2 each may provide a first frequency 616 (as indicated by A in FIG. 6B), and track k+1 and track k+3 each may provide a second frequency 618 (as indicated by B in FIG. 6B).

In FIG. 6A, the frequency ratio may be set at $(f_A/f_B)$=3/2. In this case, the stitched transitions may be aligned at every 3 cycles of $f_A$ and every 2 cycles of $f_B$. The reference frequency used by DPLL may be $f_A/3$. When the frequency of servo A and servo B becomes close, the signal intensity of two frequency signals may be more comparable. It may be preferred when the spacing loss of servo signal reading is significant.

It can also be extended to $(f_A/f_B)$=(n+1)/n. The frequency of reference signal may be $f_A/(n+1)$. Assume $(f_A/f_B)$=m/n (m>n), $f_A$=1/mT, and $f_B$=1/nT, where T is a time period. When the least common multiple of m and n, k=LCM(m,n), the reference frequency at fr=1/kT may be used for DPLL. The reference frequency may be pfr as well, where p may be an integer.

The ratio of Frequency (A):frequency (B) may be 3:2 to solve low frequency problem, by letting frequency of A closer to that of B. The frequency of synchronized bit may be ⅓ of frequency of A or ½ of frequency of B. According to various embodiments, other ratios, for example 4:3 or 5:4 may be provided.

Figure 7:
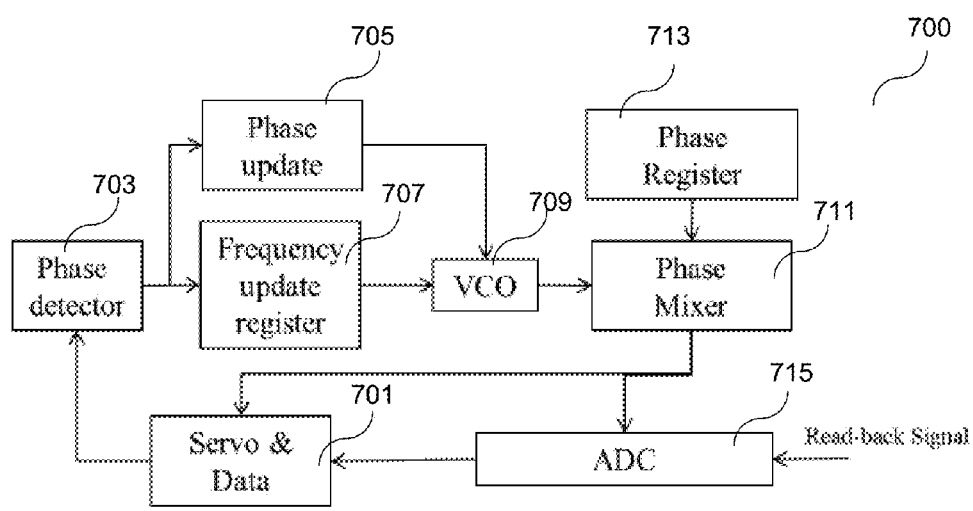
FIG. 7 shows a block diagram for timing recovery according to an embodiment.

FIG. 7 shows a block diagram for timing recovery according to an embodiment.

In FIG. 7, servo pattern and data from the recording medium are separated at servo & data separator 701. Servo data from the dedicated servo layer, for example, the signal representing the preamble in the servo pattern, may be input to a phase detector 703. The output of the phase detector 703 is input to a phase update 705 and a frequency update register 707. And a VCO (voltage controlled oscillator) 709 is configured to receive signals output from the phase update 705 and the frequency update register 707. The output signal of the VCO 709 is input to a phase mixer 711, which receives a signal output from a phase register 713 and output a phase mixed signal. The phase mixed signal output from the phase mixer 711 is converted to a digital signal at a ADC (analog-to-digital converter) 715, and the digital signal output from the ADC 715 is transmitted to the servo & data separator 701.

FIG. 7 shows is the diagram of digital phase lock loop (DPLL) used for the time recovery from the servo signals in dedicated servo layer. In other words, FIG. 7 shows the diagram of using DPLL to generate the timing recovery signal from the servo signals. The readback signal including both data and servo signals may be injected into analogy to digital converter (ADC). The digitized signal may be sent to the phase detector with reference phase information from previous bits. The phase error signal may be sent to phase and frequency registers with the updated phase and frequency. The new phase and frequency signals may be fed into voltage controlled oscillator (VCO) to produce the updated reference frequency signal. Then, the updated phase information may be feedback to the ADC and the mixed servo/data signals for the timing recovery and to provide the synchronized positioning signal along down track direction for synchronized writing and reading.

According to various embodiments, devices and methods may be provided which may provide a technology of using DPLL to do timing recovery.

A ratio of Frequency (A):frequency (B) may be M:N.

A preamble may be used to initialize the DPLL. The bursts may be sampled at LCM(M,N), which will not miss any transitions in A/B. As such, wherever the head stays, it may not miss the synchronous bit. The synchronous bit may keep DPLL working. If the data layer is written synchronously, while reading data-layer, it may not be needed to separate signals from servo and date layer phase detector. No matter what reading/writing data layer, as long the read-back signal is there, the DPLL may be working. Only one preamble may be needed.

According to various embodiments, a magnetic recording system may have a dedicated servo layer in recording medium. In the dedicated servo layer, a short length of single tone signals may be stitch written from inner diameter to outer diameter of disk medium, and it may be named as preamble. Followed by preamble, the continuous servo signals may be written at dual frequencies, $f_A$ and $f_B$, alternatively.

According to various embodiments, the ratio of dual frequencies may be at $(f_A/f_B)$=2.

According to various embodiments, the reader may always reproduce the frequency signal at $f_B$ and may use it as the reference signal for digital phase lock loop (DPLL).

According to various embodiments, the DPLL may be used to lock the position along down track direction for the synchronized writing and reading.

According to various embodiments, the number of preamble along an entire track may only be one for the initialization of DPLL.

According to various embodiments, the number of preamble along a track may be more than one.

According to various embodiments, the ratio of dual frequencies is at $(f_A/f_B)$=(n+1)/n, where n may be an integer.

According to various embodiments, the frequency of the DPLL reference may be at $f_A/(n+1)$.

According to various embodiments, the ratio of dual frequencies may be $(f_A/f_B)$=m/n (m>n), $f_A$=1/mT, and $f_B$=1/nT, where T may be a time period.

According to various embodiments, the least common multiple k=LCM(m,n), and the reference frequency at fr=1/kT may be used for DPLL.

According to various embodiments, the reference frequency may be pfr, where p is an integer.

According to various embodiments, in the DPLL system, the phase information of previous bit or preamble may be used to provide the phase reference of coming servo signals for timing recovery purpose.

While the invention has been particularly shown and described with reference to specific embodiments, it should be understood by those skilled in the art that various changes in form and detail may be made therein without departing from the spirit and scope of the invention as defined by the appended claims. The elements of the various embodiments may be incorporated into each of the other species to obtain the benefits of those elements in combination with such other species, and the various beneficial features may be employed in embodiments alone or in combination with each other. The scope of the invention is thus indicated by the appended claims and all changes which come within the meaning and range of equivalency of the claims are therefore intended to be embraced.

What is claimed is:

1. A recording medium, comprising:
a dedicated servo layer for providing servo information,
wherein the dedicated servo layer comprises a plurality of tracks,
wherein a first track comprises a first servo signal,
wherein a second track adjacent to the first track comprises a second servo signal,
wherein the first servo signal includes a first servo burst at a first frequency, and the first servo burst includes first transitions at the first frequency,
wherein the second servo signal includes a second servo burst at a second frequency different from the first frequency, and the second servo burst includes second transitions at the second frequency, and
wherein the first transitions at the first frequency and the second transitions at the second frequency comprise a plurality of common transitions at a pre-determined frequency such that the second transitions in the second servo burst are aligned with selected ones of the first transitions in the first servo burst at the pre-determined frequency.

2. The recording medium of claim 1, wherein a least common multiple of the first frequency and the second frequency is an integer.

3. The recording medium of claim 1, wherein a ratio of the first frequency to the second frequency is n:m, where n and m are integers.

4. The recording medium of claim 1, wherein a ratio of the first frequency to the second frequency is n+1:n, where n is an integer.

5. The recording medium of claim 1, wherein a third track adjacent to the second track comprises a third servo signal, the third servo signal includes a third servo burst at the first frequency, and the third servo burst includes third transitions at the first frequency.

6. A system, comprising:
the recording medium of claim 1; and
a reader configured to detect the second frequency of the second servo burst of the second track while positioned over the first track.

7. The recording medium of claim 1, wherein the dedicated servo layer is separate from a data recording layer of the recording medium.

8. The recording medium of claim 1, wherein the dedicated servo layer is located below a data recording layer of the recording medium.

9. A method of generating a reference clock signal from a recording medium, the method comprising:
providing, on the recording medium,
a dedicated servo layer for providing servo information, wherein the dedicated servo layer comprises a plurality of tracks,
a first track comprising a first servo signal, and
a second track adjacent to the first track comprises a second servo signal,
wherein the first servo signal includes a first servo burst at a first frequency, the first servo burst including first transitions at the first frequency, wherein the second servo signal includes a second servo burst at a second frequency different from the first frequency, the second servo burst including second transitions at the second frequency, and wherein the first transitions at the first frequency and the second transitions at the second frequency comprise a plurality of common transitions at a pre-determined frequency such that the second transitions in the second servo burst are aligned with selected ones of the first transitions in the first servo burst at the pre-determined frequency;
detecting the second frequency of the second servo burst of the second track using a reader positioned over the first track; and
generating the reference clock signal based on the detected second frequency.

10. The method of claim 9, wherein a least common multiple of the first frequency and the second frequency is an integer.

11. The method of claim 9, wherein a ratio of the first frequency to the second frequency is n:m, where n and m are integers.

12. The method of claim 9, wherein a ratio of the first frequency to the second frequency is n+1:n, where n is an integer.

13. The method of claim 9, wherein a third track adjacent to the second track comprises a third servo signal, the third servo signal includes a third servo burst at the first frequency, and the third servo burst includes third transitions at the first frequency.

14. The method of claim 9, wherein the dedicated servo layer is separate from a data recording layer of the recording medium.

15. The method of claim 9, wherein the dedicated servo layer is located below a data recording layer of the recording medium.

* * * * *